United States Patent [19]
Yamamoto

[11] 3,946,752
[45] Mar. 30, 1976

[54] FLUE GAS VALVE FOR THE REFINING PROCESS IN THE INERT GAS SYSTEM

[76] Inventor: Arao A. Yamamoto, C.P.O. Box 1106, Kobe, Japan

[22] Filed: Jan. 23, 1974

[21] Appl. No.: 435,988

[30] Foreign Application Priority Data
Jan. 24, 1973 Japan............................. 48-10025

[52] U.S. Cl. ................. 137/246; 137/240; 251/305
[51] Int. Cl.² ........................................... F16K 3/36
[58] Field of Search ...... 137/237, 240, 246, 246.22; 251/305

[56] References Cited
UNITED STATES PATENTS

| 965,999 | 8/1910 | Faget | 137/246 |
|---|---|---|---|
| 3,045,692 | 7/1962 | Reynolds | 137/240 |
| 3,547,140 | 12/1970 | Hastings | 137/237 X |

*Primary Examiner*—Harold W. Weakley
*Attorney, Agent, or Firm*—A. Yates Dowell, Jr.

[57] ABSTRACT

To prevent explosions in oil tankers, flue gases from a furnace or boiler are used to fill the oil tanks or gas tanks to reduce the oxygen content below the burning point and below where explosions would occur and it has been the practice to use the flue gases from the boilers for this purpose. However, the flue gases must be cleaned and scrubbed to remove soot and particularly sulphur dioxide to prevent corrosion in the oil receiving tanks of the tanker. However, in prior practice there has been no satisfactory way to prevent flue gases from getting into the scrubber and pump for delivering the scrubbed flue gases to the tanker tanks and the present invention includes a valve structure for preventing the passage of flue gases beyond the valve. The conventional valve is not entirely fluid tight and therefor some flue gases have entered into the scrubber and the pump and the piping to the tanks resulting in corrosion of the scrubber, pump, pipes and tanks which resulted in great loss. The present invention includes a butterfly valve having a first disc with its periphery substantially fluid tight in the valve body and second disc spaced from the first disc in the direction of the boiler and having its periphery appreciably smaller than the adjacent portions of the valve body so that flue gases and air can pass through the space between the periphery of the auxiliary disc and the valve body. When the valve is closed and it is not desired to have flue gases get to the tanks, air under pressure is introduced through the valve body into the space between the main and auxiliary valve discs and such air is furnished by the draft fan for the boiler and forces any flue gases back toward the boiler rather than permit such flue gases to pass to the scrubber, the pump, the water sealing tank, the pipes and the tanks of the tanker thereby preventing corrosion without requiring expensive noncorroding materials.

1 Claim, 4 Drawing Figures

FLUE GAS VALVE FOR THE REFINING PROCESS IN THE INERT GAS SYSTEM

DETAILED DESCRIPTION OF THE INVENTION

The present invention relates to improved valves which are used in flue gas supply ducts which extend from a gas generator to a liquefied fuel storage or cargo tank. The flue gas is refined to obtain inert gases which are supplied to the cargo tanks to fill any air spaces in the tanks and thereby decrease the possibility of an explosion.

For example, in an oil tanker, when the content of oxygen is reduced by replacing a gaseous mixture of oil gas and air in the cargo tank with a gaseous mixture of oil gas and inert gas, the oil gas becomes non-flammable and explosion will not occur even when a source of ignition is present. Generally, when the content of oxygen is less than 11 per cent which is less than the atmospheric oxygen content of 21 per cent, hydrocarbon gas in the gaseous state is not flammable regardless of its concentration. Therefore, should the content of oxygen be less than 5 per cent in an inert gas, the object of explosion prevention can be fully obtained.

Since this kind of inert gas is easily obtained by making use of flue gas from a boiler and a gas generator in a tanker, the flue gas is ordinarily used as inert gas. However, since sulphur dioxide which corrodes oil tanks, and soot which pollutes cargo oil, are contained in the exhaust gas, and also since the temperature of the flue gas is too high, a refining system is provided to remove these destructive gases and solids and to adequately cool the temperature of the flue gas.

Herewith I will explain the objects and details of my invention more clearly by means of the following drawings.

Figure 1:
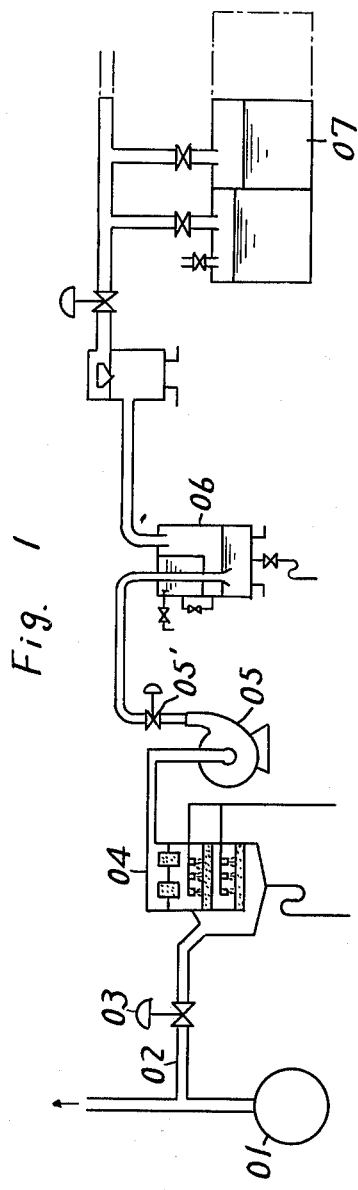
FIG. 1 is an illustrative drawing of the conventional refining process in the Inert Gas System equipped in a tanker.

In this drawing, a part of the valve is shown as a cross sectional view.

The outline of the system described above is shown in FIG. 1. The flue gas discharged from boiler 01 in the oil tanker is introduced from a flue gas conduit 02 of the boiler stack, and is led into the scrubbing tower 04 through the flue gas valve 03. Large amounts of sea water for cooling and washing the flue gas are sprayed through spray nozzles on the multiple manifolds installed at the upper part of the scrubber. As the flue gas passes through this sea water, its temperature is reduced from between 250°–450° C to sea water temperature, and at the same time, sulphur dioxide and soot in the gas are washed out. After it is sucked by the gas blower 05, the flue gas is led into the cargo tank 07 through a water seal tank 06 and other equipment to prevent the counterflow of gas.

In this case, since the flue gas valve comes in contact with a high temperature gas containing sulphur dioxide, a rubber packing cannot be used in the flue gas valve 03 used in the refining system described above to prevent leakage. However, there are two methods of preventing leakage along the flue gas conduit to the cargo tank. One of these methods is by shutting off the flue gas flow by use of an air curtain. The other method is a water seal one in which sea water is stored at the bottom of the scrubber into which the flue gas is immersed through the gas tube inlet. In the former method, the shutting off efficiency is very low as the diameter of the flue gas pipe usually ranges from 500 to 700 mm. In the latter method, the economic loss is increased as a larger load is imposed on the blower during operation, and further the sea water at the bottom of the scrubber must be present even when not in operation.

Under these circumstances, even if the flue gas valve, when it is shut, is constructed so as to prevent gas leakage as described above, the rubber packing for sealing cannot be used as mentioned previously; a metalic contact, therefore, should be made between the surface of the valve seat at the side of the valve housing and the surface of the valve seat at the valve disc. However, since a perfect contact cannot be established as a result of deformations caused by thermal expansion due to high temperatures, corrosion caused by sulphur dioxide gas, damage by dust and soot, etc., leakage of gas often occurs and the valve frequently gets stuck.

In view of the conventional type butterfly valve, it is impossible to completely shut off the flue gas regardless of the material and structure used for the valves. A similar result is obtained when a gate valve or a globe valve is used.

A description of the refining system of inert gas is given in the following. Judging from the purpose of the system, once the air in the empty tanks is first replaced by inert gas, the filling-up operation of inert gas is carried out mainly when unloading the cargo oil, and sometimes when the pressure of the inert gas in the tanks is reduced to a negative pressure due to a lowering of temperature during navigation, and furthermore, at the time when washing sludge and the like off the walls of the cargo tanks. All the instances mentioned only require the system to be operated for a short period.

For example, the operating period of this system including the time of unloading takes about 1–2 days per navigation which usually takes about 45 days. During the rest of the navigational period, the system is not in operation. As shown above, as the operating period of the system is very short and a large amount of sea water is continuously supplied to the scrubber 04 for cooling and washing purposes, corrosion due to sulphuric acid does not occur even when usual acid-resistant materials are used in the system.

However, when the system is not in operation for a long period, cooling water is not supplied and the flue gas containing sulphur dioxide leaks through the shut flue gas valve 03 and enters the scrubber 04 or the gas blower 05. Here, the gas is cooled by the atmosphere through the outer wall. As a result, sulphuric acid is continuously formed on the inner wall causing damage to this system. Therefore, if an expensive, special material is not used, the life of the refining system of inert gas becomes extremely short in practice.

Judging from the situation described above, it is a purpose of the present invention to overcome the above-described defects by providing a flue gas valve of the air-sealing type for preventing flue gas leakage in which an auxiliary valve disc is provided in conjunction with the valve disc of the butterfly valve with a pressurized fresh air zone for sealing between these discs by providing a zone of increased pressure.

Figure 2:
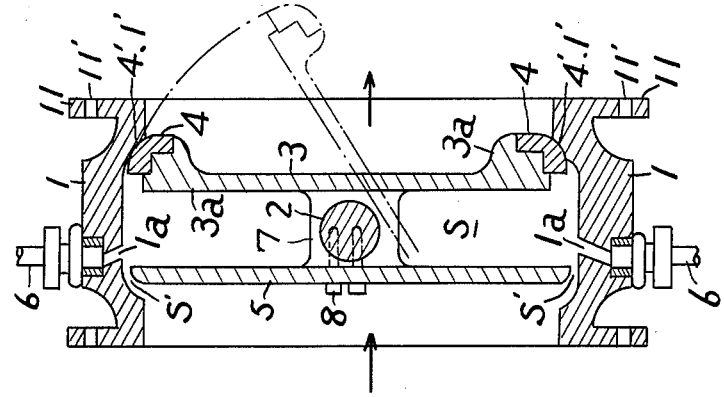
FIG. 2 is a drawing of the longitudinal cross section of the valve in the shut position as an example of the present invention.
Figure 3:
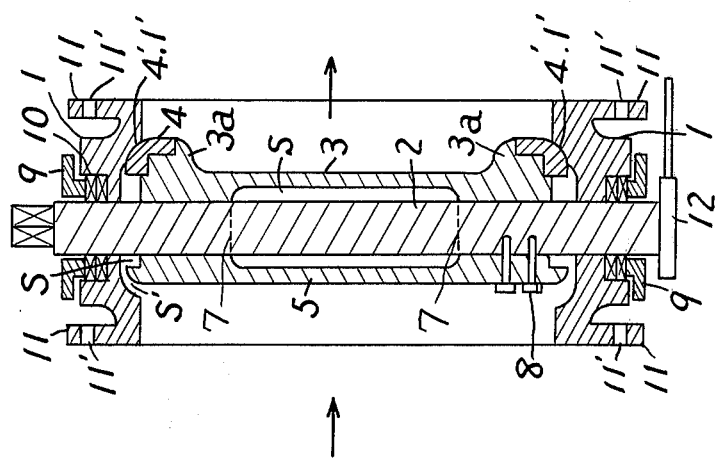
FIG. 3 is a horizontal cross section of FIG. 2.

The present invention will be explained in detail refering to a preferable embodiment. In FIGS. 2 and 3, 1 designates the ring valve housing made of an acid and heat-resisting cast iron containing nickel and chromium. 2 stands for the valve spindle which is made of a special steel containing nickel, chromium and molybdenum and which penetrates the valve housing 1 in a radial direction.

3 stands for the circular-type main valve disc of the butterfly valve fixed by the valve spindle 2. These drawings show the shut position of the valve housing 1 in connection with the valve seat ring 4. The valve seat ring 4 of the valve is screwed onto the surface of the swelled area 3a of the valve disc 3. The convex arc of the swelled or enlarged outer area 3a of the valve seat ring and the concave arc of the valve housing 1 can come into contact at 4'. 1' by making their spherical centers the center of the valve spindle and allowing the space between the arcs to be equal all around.

A circular-type auxiliary valve disc 5 is disposed in parallel relationship to the main valve disc 3. The auxiliary valve disc 5 is fixed to the valve spindle 2 in the same way as the main valve disc 3. It is designed so that a clearance S' is formed between the auxiliary valve disc and the inner circumference of the valve housing 1.

In FIG. 3 a sealing air port 1a is fitted on the valve housing 1 to allow a sealing air pipe 6 to be connected with the sealing air pocket S. The sealing air pipes 6 are connected to the boiler forced draft fan through a relief valve 6'.

A bracket 7 is provided for fixing the valve spindle 2 to both the main valve disc 3 and the auxiliary valve disc 5. Furthermore, the bracket 7 is designed to fix the valve spindle 2 to both the main valve disc 3 and the auxiliary valve disc 5 by bolts 8.

A packing gland 9 is provided for pressing the packing 10 in the stuffing box forming a part of the valve housing in which the valve spindle 2 is penetrated.

Coupling flanges 11 connect the pipes at both sides of the valve housing 1. On the flanges are drilled-through bolt holes 11' in which bolts are set to connect the pipe flanges. An operating arm 12 is fitted at the bottom of the valve spindle 2.

Figure 4:
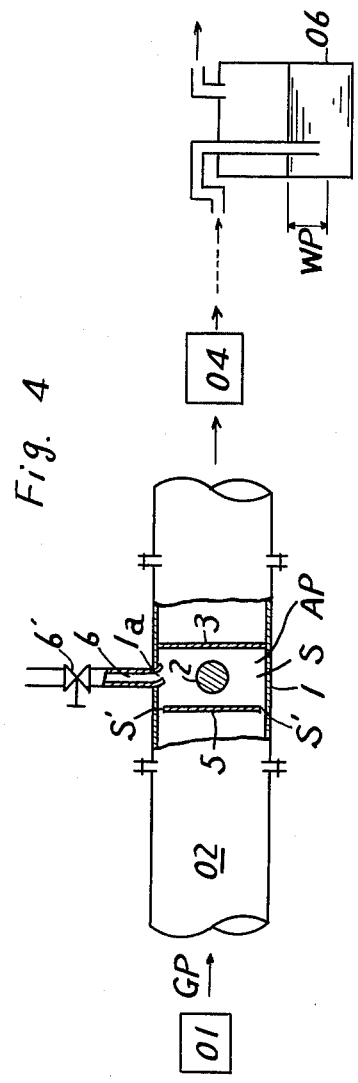
FIG. 4 is an illustrative front view of the valve of the present invention in an operating state.

The butterfly valve in the present embodiment as described above is arranged so as the main valve disc 3 faces the scrubber side 04 and the auxiliary valve disc 5 faces the boiler side 01 of the flue gas conduit 02. FIG. 4 shows the valve in its closed state. In the closed state, the sealing air pocket S is kept pressurized by the boiler draft fan, and fresh air which is adjusted to a suitable pressure by the relief valve 6' is led into the sealing air pocket S through the sealing air port 1a.

The air pressure AP in the sealing air pocket S is to be adjusted so as to be greater than the flue gas pressure GP in the flue gas conduit 02. Fresh air in the sealing air pocket S thereby passes into the flue gas conduit 02 through the clearance S' made between the auxiliary valve disc 5 and the valve housing 1. On the other hand, flue gas never flows into the pressurized air zone in the sealing air pocket S through the clearance S' because of the higher air pressure AP in the sealing air pocket S.

However, as some fresh air in the sealing air pocket S leaks through the valve disc 3, it enters into the scrubber 04 and moreover into the blower 05 during a long navigational period. As specified in FIG. 1, this leaked fresh air can be easily intercepted at valve 05' which utilizes a rubber packing. Should there be any trouble at the valve, however, fresh air can be intercepted at the water seal tank 06 which prevents the counterflow of oil gas into the cargo tanks. The pipe from the blower is led into the water seal tank and 300 mm of one end of this pipe is immersed in the water seal tank. Should the water colum pressure WP be lower than 300 mm AP in the sealing air pocket S, the leaked air is perfectly intercepted at the water seal tank and there is no longer any danger of the leaked air entering the cargo tanks.

The above-mentioned sealing air pressure is suitable at about 200 mm in view of the actual flue gas pressure being about 150 mm as well as the length of the pipe immersion being 300 mm. When the scrubber 04 is in operation, if the relief valve 6' is shut and the flue gas valve is open, this flue gas valve can be operated as an ordinary flue gas valve.

The present invention provides complete prevention of leakage by forming a stable sealing zone of pressurized air, while maintaining the previous structure of the butterfly valve and adding a simple construction of the auxiliary valve disc.

Therefore, should this present invention be applied on cargo oil tankers and liquefied gas carriers which are being built in large numbers in recent times, the inert gas system can be maintained for a longer period. The present invention is, therefore, to be a great contribution to the shipping industry, especially with a view to tankers.

I claim:

1. In the flue gas valve for controlling the flow of flue gas from a generator to a receiver having a valve body defining a flue gas passage therethrough, a shaft rotatably mounted on the body transverse to the flue gas passage, a main valve disc fixed to one side of the shaft between the shaft and the receiver and an auxiliary valve disc mounted generally parallel to the main valve disc on the other side of the shaft between the shaft and the generator, and having an air passage for introducing air at a higher pressure than the pressure of the flue gas, the passage for air opening into the space between the valve discs; the improvement comprising the main valve disc having a valve seat ring disposed around the outer periphery thereof for snugly engaging the valve body to close the flue gas passage when said main valve disc is in a closed position transverse to the flue gas passage, the auxiliary valve disc having an outer periphery of slightly smaller radial dimension than said flue gas passage of the flue gas valve so that an air space is provided between the auxiliary valve disc and the valve body when the auxiliary valve disc is in a closed position transverse to the flue gas passage, whereby when said valve discs are closed air passing through the air passage will prevent flue gases from passing through the flue gas passage of the valve while said valve seat ring of the main valve disc is maintained in snug engagement with said valve body.

* * * * *